(12) United States Patent
Lan et al.

(10) Patent No.: US 6,262,162 B1
(45) Date of Patent: Jul. 17, 2001

(54) LAYERED COMPOSITIONS WITH MULTI-CHARGED ONIUM IONS AS EXCHANGE CATIONS, AND THEIR APPLICATION TO PREPARE MONOMER, OLIGOMER, AND POLYMER INTERCALATES AND NANOCOMPOSITES PREPARED WITH THE LAYERED COMPOSITIONS OF THE INTERCALATES

(75) Inventors: Tie Lan, Lake Zurich; Erin K. Westphal, Oakwood Hills; Vasiliki Psihogios, Wheeling; Ying Liang, Lake Zurich, all of IL (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 09/272,279

(22) Filed: Mar. 19, 1999

(51) Int. Cl.[7] ..................................................... C08K 3/34
(52) U.S. Cl. ........................ 524/445; 524/447; 524/448; 501/148; 428/333; 428/338; 428/339
(58) Field of Search .................................. 524/445, 447, 524/448, 449, 450

(56) References Cited

U.S. PATENT DOCUMENTS

| | | | |
|---|---|---|---|
| 2,035,546 | 3/1936 | Hamilton | 167/24 |
| 3,419,460 | 12/1968 | Ure | 161/162 |
| 3,419,517 | 12/1968 | Hedrick et al. | 260/37 |
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 3,929,849 * | 12/1975 | Oswald | 260/448 |
| 4,053,493 * | 10/1977 | Oswald | 260/448 |
| 4,116,866 * | 9/1978 | Finlayson | 252/316 |
| 4,125,411 | 11/1978 | Lyons | 106/291 |
| 4,136,103 * | 1/1979 | Oswald | 260/448 |
| 4,210,572 | 7/1980 | Herman et al. | 260/404 |
| 4,251,576 | 2/1981 | Osborn et al. | 428/331 |
| 4,400,485 | 8/1983 | Mukamal et al. | 524/444 |
| 4,427,790 * | 1/1984 | Miale et al. | 502/71 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,851,021 | 7/1989 | Bohrn et al. | 65/17 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 4,956,121 | 9/1990 | Tymon et al. | 252/378 R |
| 5,028,351 | 7/1991 | Kato et al. | 252/315.2 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 * | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,552,469 | 9/1996 | Beall et al. | 524/445 |
| 5,554,670 | 9/1996 | Giannelis et al. | 523/209 |

(List continued on next page.)

FOREIGN PATENT DOCUMENTS

| | | |
|---|---|---|
| 1 642 122 | 7/1970 | (DE) . |
| 281 585 A5 | 8/1990 | (DE) . |
| 0 205 281 A3 | 12/1986 | (EP) . |

(List continued on next page.)

OTHER PUBLICATIONS

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

(List continued on next page.)

Primary Examiner—Edward J. Cain
Assistant Examiner—K. Wyrozebski-Lee
(74) Attorney, Agent, or Firm—Marshall, O'Toole, Gerstein, Murray & Borun

(57) ABSTRACT

Intercalated layered materials prepared by co-intercalation of a multi-charged onium ion spacing/coupling agent and a matrix polymer between the planar layers of a swellable layered material, such as a phyllosilicate, preferably a smectite clay. The spacing of adjacent layers of the layered materials is expanded at least about 3 Å, preferably at least about 5 Å, usually to about 15–20 Å, e.g., 18 Å with the di-charged onium ion spacing/coupling agent. The intercalation of the matrix polymer then increases the spacing between adjacent layers to at least about 15 Å, preferably to about 20 Å to about 30 Å.

53 Claims, 3 Drawing Sheets

U.S. PATENT DOCUMENTS

| | | | |
|---|---|---|---|
| 5,578,672 | 11/1996 | Beall et al. | 624/446 |
| 5,659,034 * | 8/1997 | DeBord et al. | 546/2 |
| 5,667,886 | 9/1997 | Gough et al. | 428/331 |
| 5,698,624 | 12/1997 | Beall et al. | 524/445 |
| 5,721,306 | 2/1998 | Tsipursky et al. | 524/449 |
| 5,730,996 | 3/1998 | Beall et al. | 424/405 |
| 5,747,403 | 5/1998 | Boyd et al. | 502/62 |
| 5,747,560 * | 5/1998 | Christiani et al. | 523/209 |
| 5,760,106 | 6/1998 | Pinnavaia et al. | 523/209 |
| 5,760,121 | 6/1998 | Beall et al. | 524/450 |
| 5,766,751 | 6/1998 | Kotani et al. | 428/323 |
| 5,801,216 * | 9/1998 | Pinnavaia et al. | 523/209 |
| 5,804,613 | 9/1998 | Beall et al. | 523/200 |
| 5,830,528 | 11/1998 | Beall et al. | 427/220 |
| 5,837,763 | 11/1998 | Ferraro et al. | 524/449 |
| 5,844,032 | 12/1998 | Serrano et al. | 524/445 |
| 5,849,830 | 12/1998 | Tsipursky et al. | 524/450 |
| 5,853,886 | 12/1998 | Pinnavaia et al. | 428/403 |
| 5,877,248 | 3/1999 | Beall et al. | 524/450 |
| 5,880,197 | 3/1999 | Beall et al. | 524/445 |
| 6,071,988 | 6/2000 | Barbee et al. | 523/210 |
| 6,084,019 | 7/2000 | Matayabas, Jr. et al. | 524/445 |

FOREIGN PATENT DOCUMENTS

| | | |
|---|---|---|
| 0 335 653 A1 | 10/1989 | (EP) . |
| 0 358 415 A1 | 3/1990 | (EP) . |
| 0 479 031 A1 | 4/1992 | (EP) . |
| 0 548 940 A1 | 6/1993 | (EP) . |
| 0 619 182 A1 | 10/1994 | (EP) . |
| 0 645 181 A2 | 3/1995 | (EP) . |
| 0 747 451 A2 | 12/1996 | (EP) . |
| 0 761 739 A1 | 3/1997 | (EP) . |
| 0 780 340 A1 | 6/1997 | (EP) . |
| 1 146 668 | 3/1969 | (GB) . |
| 1 565 362 | 4/1980 | (GB) . |
| 2 088 932 | 6/1982 | (GB) . |
| WO 93/04117 | 3/1993 | (WO) . |
| WO 93/04118 | 3/1993 | (WO) . |
| WO 93/11190 | 6/1993 | (WO) . |
| WO 96/08526 | 3/1996 | (WO) . |
| WO 98/01346 | 1/1998 | (WO) . |

OTHER PUBLICATIONS

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By ε–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", Journal of the Ceramic Society of Japan, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", Clay Science, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Sanchez Camazano, M. et al., "Factors influencing interactions of organophosphorus pesticides with montmorillonite", Chemical Abstracts, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation", Polym. Mater. Sc. Eng., 73, pp. 296–297 (1995).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

* cited by examiner

LAYERED COMPOSITIONS WITH MULTI-CHARGED ONIUM IONS AS EXCHANGE CATIONS, AND THEIR APPLICATION TO PREPARE MONOMER, OLIGOMER, AND POLYMER INTERCALATES AND NANOCOMPOSITES PREPARED WITH THE LAYERED COMPOSITIONS OF THE INTERCALATES

FIELD OF THE INVENTION

The present invention is directed to intercalated layered materials and, optionally, exfoliates thereof, prepared by contacting, and thereby intercalating, a layered silicate material, e.g., a phyllosilicate, such as a smectite clay, with a spacing/coupling agent that is multi-positively charged (hereinafter "multi-charged"), preferably dual-charged, and co-intercalation of the layered material with a co-intercalant (as co-intercalant polymerizable reactants, or as the oligomer co-intercalant or polymer co-intercalant) to form nanocomposite materials. The co-intercalant monomer, oligomer or polymer can be intercalated after or together with intercalation of the multi-charged spacing/coupling agent, such as by direct compounding, e.g., by combining a multi-charged onium ion-intercalated layered material and a co-intercalant monomer, polymer or oligomer in a mixing or extruding device to produce the co-intercalated layered material and the nanocomposite. The interlaminar spacing of adjacent layers (platelets) of the layered material (d-spacing minus one platelet thickness of the layered material) is expanded at least 3 Å, preferably at least 5 Å, to at least about 10 Å, preferably to at least about 15 Å, and usually to about 18 Å by contacting the layered material with the multi-charged spacing/coupling agent for simultaneous or subsequent intercalation with co-intercalant polymer reactants, an oligomer co-intercalant or a polymer co-intercalant. The multi-charged spacing/coupling agents have at least two charged, ion-exchange atoms capable of ion-exchanging with $Li^+$, $Na^+$, $K^+$, $Ca^{+2}$, $Mg^{+2}$, or other inorganic cations that occur within the interlayer spaces between adjacent silicate layers or platelets of the layered silicate materials being intercalated. The association of the layered material inorganic cations with the at least two charged sites of the multi-charged spacing/coupling agent enables the conversion of the hydrophilic interior clay platelet surfaces to hydrophobic platelet surfaces, by substantially complete ion-exchange of the interlayer exchangeable cations on the platelet surfaces with the onium ions, while intercalating and ion-exchanging substantially less onium ions into the space between adjacent platelets, leaving more space for co-intercalation of an oligomer or polymer when compared with single-charged onium ion analogues. Therefore, polymerizable monomers capable of reacting to form a polymer co-intercalant, or polymerizable oligomer co-intercalant molecules, or a co-intercalant polymer can be easily and more fully intercalated between adjacent platelets of the layered silicate material, e.g., smectite clay platelets.

In accordance with the preferred embodiment of the present invention, a fully polymerized co-intercalant polymer, having a weight average molecular weight between about 100 and about 5 million, preferably about 1,000 to about 500,000, can be co-intercalated between adjacent platelets of the multi-charged spacing/coupling agent-intercalated layered material, preferably simultaneously with dispersing the multi-charged onium ion-intercalated layered material into a matrix polymer, i.e., by direct compounding of the multi-charged spacing/coupling agent-intercalated layered material with the co-intercalant oligomer or polymer, by adding excess co-intercalant oligomer or polymer, and without separation of the resulting intercalate, the excess co-intercalant polymer becomes the matrix polymer—the same as the co-intercalant polymer. The intercalation of the multi-charged spacing/coupling agent and a co-intercalant oligomer or polymer, or its monomeric reactants (co-intercalant polymerizable monomer reactants, co-intercalant oligomer, and co-intercalant polymer being referred to collectively as "intercalant polymer" or "co-intercalant polymer" hereinafter for simplicity), results in a completely homogeneous dispersion of co-intercalated layered material in a matrix polymer, or a nanocomposite composition. Optionally, the nanocomposite material can be sheared, at or above the melt temperature of the matrix polymer, to exfoliate up to 100% of the tactoids or platelet clusters into individual platelets such that more than 50% by weight of the platelets are in the form of single platelets, e.g., more than 60%; more than 70%; more than 80%; or more than 90% by weight of the layered material can be completely exfoliated into single platelet layers.

The intercalates of the present invention can be used as organoclays for sorption of organic materials, or can be dispersed uniformly into solvents to increase the viscosity of organic liquids; or the intercalates can be dispersed into matrix polymer materials to form polymer/clay intercalate nanocomposites, e.g., by direct compounding of the multi-charged spacing/coupling agent-intercalated clay with sufficient co-intercalant oligomer or polymer to achieve sufficient intercalation of the clay to form a concentrate, that can later be mixed with a matrix polymer and/or additional intercalant polymer, or different polymeric materials to form a nanocomposite. Alternatively, the multi-charged spacing/coupling agent-intercalated clay can be co-intercalated with monomer reactants that are polymerizable to form the polymer co-intercalant.

In another embodiment of the present invention, the multi-charged spacing/coupling agent-intercalated layered material can be dispersed in a matrix monomer followed by polymerization of the matrix monomer, in-situ, e.g., by adding a curing agent, to form the nanocomposite material. Also, curing agents can be directly incorporated into monomeric reactants that are co-intercalated between platelets of the multi-charged spacing/coupling agent-intercalated clay followed by polymerization of the reactant intercalant monomers that have been intercalated into the clay interlayer galleries.

In accordance with an important feature of the present invention, if an intercalant polymer is co-intercalated into the multi-charged spacing/coupling agent-intercalated clay galleries to form a co-intercalate and additional polymer is added to form a nanocomposite, the co-intercalant polymer can be directly compounded with the matrix polymer to form a nanocomposite easily, and the co-intercalate can be more fully loaded with co-intercalant polymer than if a single-charged onium ion spacing/coupling agent were used to space the platelets. If the polymerizable co-intercalant monomers, or a polymerizable oligomer intercalant is co-intercalated into the clay galleries, the co-intercalant(s) can be polymerized together with a desired monomer, oligomer or polymer matrix material, and the matrix material then can be polymerized or further polymerized together with the co-intercalant and compounded to form the nanocomposite.

BACKGROUND OF THE INVENTION AND PRIOR ART

It is well known that phyilosilicates, such as smectite clays, e.g., sodium montmorillonite and calcium montmorillonite, can be treated with organic molecules, such as organic ammonium ions, phosphonium ions, or sulfonium ions (onium ions), to intercalate the organic molecules between adjacent, planar silicate layers, for ion-exchange of the organic onium ion molecules with the interlayer exchangeable cations to space the adjacent layers or platelets of the layered silicate material (interlaminar spacing) sufficiently for intercalation of a polymer between the spaced layers, see, for example, U.S. Pat. Nos. 4,739,007; 4,810,734 and 5,164,460. The thus-treated, intercalated phyllosilicates, having interlayer spacings increased by at least 3 Å, preferably at least 5 Å, to an interlayer (interlaminer) spacing of at least about 10–25 Angstroms (Å) and up to about 100 Å then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see 4,739,007; 4,810,734; 5,102,948; and 5,385,776 —have been found to substantially improve one or more properties of the matrix polymer, such as mechanical strength, oxygen impermeability, and/or high temperature characteristics.

Exemplary prior art composites, also called "nanocomposites", are disclosed in a published PCT application of Allied Signal, Inc. WO 93/04118 and U.S. Pat. No. 5,385,776, disclosing the admixture of individual platelet particles derived from intercalated layered silicate materials, with a matrix polymer to form a nanocomposite having one or more properties of the matrix polymer improved by the addition of the at least partially exfoliated intercalate. As disclosed in WO 93/04118 and U.S. Pat. No. 5,554,670, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules.

In accordance with a preferred embodiment of the present invention, intercalates are prepared by contacting a layered silicate material, such as a phyllosilicate, with a multi-charged onium ion spacing/coupling agent, such as a di-onium ion spacing/coupling agent compound, and having at least 2 carbon atoms, up to about 24 carbon atoms separating the two onium cations. Exemplary of such suitable multi-charged spacing/coupling agent molecules include quaternary diammonium ions, disulfonium ions, diphosphonium ions, dioxonium ions, or any multi-charged onium ion compound of an element in Groups V or VI of the periodic table of elements.

The multi-charged onium ion spacing/coupling agents useful in accordance with the present invention may be multi-charged upon dissociation of anions from the molecule when dissolved in water and/or an organic solvent, or the molecule may be neutral and subsequently protonated to provide onium ion molecules having multiple positively charged atoms, in solution.

Depending upon the cation exchange capacity of the layered silicate material, e.g., a smectite clay, the interior platelet surfaces of the silicate platelets include negative charge centers that have spacings that vary between about 4 Å and about 20 Å (equal to the spacing, or distance, between adjacent exchangeable cations in the interlaminar space).

In accordance with the principles of the present invention, it has been found that multi-charged onium ion spacing/ coupling agents can be intercalated between adjacent platelets to ion-exchange with interlayer cations, e.g., $Na^+$ ions, to balance the negative charge centers within the same silicate platelet surface, at each properly spaced charged onium ion atom, to space adjacent platelets sufficiently, using less spacing/coupling agent. In the preferred embodiment, at least two of the charged atoms of the multi-charged onium ion spacing/coupling agent are spaced with intermediate organic molecules, e.g., $—CH_2—CH_2—$; $—CH_2—CH_2—CH_2$; and the like, to space the charged onium ion atoms (e.g., $N^\pm$ space $—N^+$) a distance of about 5 Å (for high charge density layered materials) to about 24 Å (for low charge density layered materials). With such preferred spacing between charged onium ion atoms, ion-exchange with interlayer cations occurs at both charged onium ion atoms, thereby necessitating less onium ion intercalation to achieve complete ion-exchange, while achieving sufficient silicate platelet spacing for oligomer or polymer co-intercalation, and permitting co-intercalation of higher quantities of co-intercalant oligomer or polymer.

As shown in FIGS. 1A and 1B, a layered material having a high charge density, having a spacing between adjacent interlayer platelet surface negative charge centers in the range of about 6 Å to about 12 Å can be ion-exchanged at both adjacent charged atoms of a dual-charged onium ion spacing/coupling agent that has the charged atoms spaced a distance of about 4 Å to about 14 Å or 16 Å. The spacing between the closest two charged atoms of the multi-charged onium ion spacing/coupling agent need not be exactly the same as the spacing between adjacent exchangeable cations on the platelet surface of the layered material since each negative charge within and extending above the platelet surface (corresponding to the location of the exchangeable cations) diffuses radially outwardly, from the negative charge center, a distance of about 5 Å. The dashed line circles surrounding the adjacent negative charge centers, as shown in FIGS. 1A and 1B, represent diffusing negative charges that are weaker farther away from the negative charge center, and are located directly above the exchangeable cations, e.g., $Na^+$, as shown in FIGS. 1A and 1B. Preferred spacing between closest charged atoms of the spacing/coupling agent for high to medium charge density (150 milliequivelents per 100 grams C.E.C.* to 70 milliequivelents per 100 grams C.E.C.*) layered materials is about 6 Å to about 20 Å, corresponding to a $C_3$ to $C_{10}$ molecule backbone in the organic spacing molecule between charged onium ion atoms. Preferred spacing between onium ion spacing/coupling agent charged atoms for medium to low charge density (70 milliequivelents per 100 grams C.E.C.* to 30 milliequivelents per 100 grams C.E.C.*) layered materials is about 12 A to about 24 Å, corresponding to a C6 to $C_{12}$ molecule backbone in the organic spacing molecule covalently bonded to both charged onium ion atoms.

*Cation exchange capacity.

In accordance with an important feature of the present invention, best results are achieved by mixing the layered material with the (multi-charged spacing/coupling agent, in a concentration of at least about 0.25 moles of onium ion multi-positively charged, cation portion of the onium ion compound) per mole of interlayer exchangeable cations, preferably at least a 0.5:1 molar ratio, more preferably at least 1:1 molar ratio of multi-charged onium ion cation:exchangeable interlayer cations. When less than all of the interlayer cations are ion-exchanged with multi-charged onium ions, the remainder of the interlayer cations can remain in place, or at least a portion of the remaining interlayer cations may be exchanged with single-charged onium ions. For most layered materials, such as sodium montmorillonite clays, the above molar ratios are achieved by intercalating at least about 2% by weight, preferably at least about 5% by weight multi-charged spacing/coupling agent compound, more preferably at least about 10% by weight, and most preferably about 30% to about 200% by weight multi-charged spacing/coupling agent cation, based on the dry weight of the layered material in the intercalating composition. Regardless of the concentration of multi-charged spacing/coupling agent compound in the intercalating composition, the weight ratio of multi-charged spacing/coupling agent intercalant: layered material should be at least 1:20, preferably at least 1:10, more preferably at least 1:5, and most preferably at least about 1:4 to achieve sufficient intercalation of one or more co-intercalants such as oligomer or polymer (or its monomeric reactants) between adjacent inner surfaces of adjacent platelets of the layered material. The multi-charged spacing/coupling agent compound sorbed between and ion-exchanged with the silicate platelets, via ion-exchange at multiple charged atoms, causes surprisingly easy intercalation of a co-intercalant oligomer or polymer, in greater amounts than heretofore possible, or intercalation of increased amounts of monomeric reactants for polymerization in-situ.

In accordance with an important feature of the present invention, it has been found that a multi-charged spacing/coupling agent-intercalated phyllosilicate, such as a smectite clay, can be co-intercalated easily with a co-intercalant polymer to form an intercalate that has unexpectedly superior intercalate dispersibility in a matrix polymer, and unexpectedly can be co-intercalated with higher amounts of co-intercalate polymer molecules. The intercalate also can be added to any other matrix polymer to enhance a number of properties of the matrix polymer, including tensile strength, heat distortion temperature, glass transition temperature, gas-impermeability, elongation, and the like.

The multi-charged spacing/coupling agent-intercalated layered material, that is co-intercalated with a polymer co-intercalant, and/or exfoliates thereof, can be admixed with a matrix polymer or other organic monomer compound(s) or composition to increase the viscosity of the organic compound or provide a matrix polymer/intercalate and/or matrix polymer/exfoliate composition to enhance one or more of the above-mentioned properties of the matrix polymer.

The multi-charged spacing/coupling agent-intercalated layered material and intercalating process of the present invention provide a unique organoclay useful for all known purposes of organoclays, that includes more interlayer space for sorption of organic liquids and gases. Also, in accordance with a preferred embodiment of the present invention, the intercalate can be added, particularly by direct compounding (mixing the intercalate directly into a matrix polymer melt) of the intercalate with any matrix polymer, thermoplastic or thermosetting. Examples of market-available resin systems for use as the co-intercalant polymer and/or the matrix polymer of the nanocomposites include epoxy resins such as: Bisphenol A-derived resins, Epoxy cresol Novolac resins, Epoxy phenol Novolac resins, Bisphenol F resins, polynuclear phenol-glycidyl ether-derived resins, cycloaliphatic epoxy resins, aromatic and heterocyclic glycidyl amine resins, tetraglycidylmethylenedianiline-derived resins, nylons, such as nylon-6 and nylon 66, and particularly MXD6 nylon (meta-xylylene diamine and adipic acid polymerized polyamides).

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes multi-charged onium ion spacing/coupling agent molecules disposed between adjacent platelets of the Layered Material and ion-exchanged with cations of an inner platelet surface at multiple (at least two) charged atoms of the spacing/coupling agent to increase the interlayer spacing between the adjacent platelets at least 3 Å, preferably at least 5 Å to an interlayer spacing, for example, of at least about 10 Å, preferably to at least about 15 Å, e.g., 18 Å; and after intercalation of a co-intercalant polymer, the d-spacing of the co-intercalate is increased to at least about 20 Å, preferably to 25 Å to 35 Å.

"Intercalation" shall mean a process for forming an Intercalate.

"Multi-charged Spacing/Coupling Agent" shall mean a monomeric organic compound that includes at least two positively charged atoms, such as two or more protonated nitrogen (ammonium or quaternary ammonium) atoms ($N^+$); two or more positively charged phosphorous (phosphonium) atoms ($P^+$); two or more positively charged sulfur (sulfonium) atoms ($S^+$); two or more positively charged oxygen (oxonium) atoms ($O^+$); or any combination of two or more $N^+$, $P^+$, $S^+$ and/or $O^+$ atoms that are spaced by at least two substituted or unsubstituted carbon atoms, preferably separated by 3 to 24, more preferably 3 to 6 carbon atoms. Preferred are di-quaternary ammonium compounds that include two spaced positively charged atoms selected from $N^+$, $P^+$, $S^+$, $O^+$ or a combination of any two or more. When dissolved in water and/or an organic solvent, an anion may dissociate from the multi-charged spacing/coupling agent compound leaving a multi-charged cation molecule having at least two positively charged atoms selected from nitrogen, phosphorus, sulfur, and/or oxygen, the positively charged atoms spaced by two or more carbon atoms; the multi-charged onium ion preferably having a positively charged atom disposed on opposite ends of a di-positively charged onium ion spacing/coupling agent intercalant molecule.

"Co-intercalation" shall mean a process for forming an intercalate by intercalation of a multi-charged spacing/coupling agent and, at the same time or separately, co-intercalation of an oligomer or polymer, or intercalation of co-intercalant polymerizable monomers capable of reacting or polymerizing to form a polymer.

"Concentrate" shall mean an intercalate formed by intercalation of a multi-charged spacing/coupling agent and a co-intercalant polymer, said intercalate combined with a matrix polymer, in an intercalate concentration greater than needed to improve one or more properties of the matrix polymer, so that the concentrate can be mixed with additional matrix polymer to form a nanocomposite composition or a commercial article.

"Intercalating Carrier" shall mean a carrier comprising water and/or an organic solvent used with the multi-charged onium ion spacing/coupling agent and/or with the co-intercalant polymer or co-intercalant polymerizable monomers or oligomers to form an Intercalating Composition capable of achieving Intercalation of the multi-charged onium ion spacing/coupling agent and, at the same time or separately, intercalation of the co-intercalant polymer or co-intercalant polymerizable monomers or oligomers between platelets of the Layered Material.

"Intercalating Composition" or "Intercalant Composition" shall mean a composition comprising a multi-charged onium ion spacing/coupling agent, and/or an intercalant polymer or intercalant polymerizable monomers or oligomers and a Layered Material, with or without an Intercalating Carrier.

"Exfoliate" or "Exfoliated" shall mean individual platelets of an Intercalated Layered Material, or tactoids or clusters of individual platelets, e.g., 2–10 platelets, preferably 2–5 platelets, that are smaller in total thickness than the non-exfoliated Layered Material, dispersed as individual platelets or tactoids throughout a carrier material, such as water, a polymer, an alcohol or glycol, or any other organic solvent, or throughout a matrix polymer.

"Exfoliation" shall mean a process for forming an Exfoliate from an Intercalate.

"Matrix Polymer" shall mean a thermoplastic or thermosetting polymer that the Intercalate or Exfoliate is dispersed within to improve the mechanical strength, thermal resistance, e.g., raise the glass transition temperature (Tg), and/or the decrease gas ($O_2$) impermeability of the Matrix Polymer.

SUMMARY OF THE INVENTION

In brief, the present invention is directed to organoclays or intercalated layered materials prepared by intercalation of a multi-charged spacing/coupling agent between adjacent silicate platelets of a swellable layered material and co-intercalates and nanocomposite materials formed by co-intercalating monomer, oligomer or polymer molecules between the spacing/coupling agent-intercalated planar silicate layers or platelets of the swellable layered material, such as a phyllosilicate, preferably a smectite clay, such as sodium montmorillonite clay. The spacing of adjacent layers of the layered material is expanded at least 3 Å, preferably at least about 5 Å to at least about 10 Å, preferably to at least about 15 Å, usually about 15–30 Å with the multi-charged onium ion spacing/coupling agent to form the novel organoclays. The co-intercalation of a monomer, oligomer or polymer (hereinafter sometimes collectively referred to as "polymer") co-intercalant then increases the d-spacing of adjacent layers to at least about 20 Å, preferably to about 25 Å to about 35 Å, and up to about 300 Å, for use in increasing the viscosity of organic liquids and, in a preferred embodiment, for admixture with a matrix polymer to form a nanocomposite material or composition.

The present invention is directed to a method of preparing intercalated layered materials prepared by intercalation of a multi-charged onium ion spacing/coupling agent and, in a preferred embodiment, co-intercalating an oligomeric or polymeric co-intercalant into the galleries of the layered material to form intercalates or intercalate concentrate compositions for incorporation into, as by direct compounding with a matrix polymer melt, one or more matrix polymers.

The present invention also is directed to exfoliates prepared from the intercalate or intercalate concentrate compositions. The exfoliate can be prepared by diluting the concentrate in a (or additional) matrix polymer, and then curing. The presence of polymerizable monomer or oligomer or polymer in the galleries of the layered materials makes the layered materials compatible with a matrix polymer, when the intercalate is added to additional matrix polymer that is the same as the monomer, oligomer or polymer co-intercalated.

When a polymer curing agent is added, the layered materials may be exfoliated by virtue of an expanding, polymerizing intercalated monomer or oligomer and resulting polymer molecules dispersed between platelet layers, depending upon the degree of polymerization achieved. The intercalates, and/or exfoliated individual or tactoid layers of the layered materials, will perform as a polymer reinforcement and molecule (gas) barrier in a matrix polymer to improve the mechanical properties and barrier properties, e.g., lower gas permeability and raise glass transition temperature (Tg), of the matrix polymer. The exfoliate also can be prepared by directly adding a curing agent to the monomer-/oligomer-/or polymer-intercalated concentrate. The curing agent will penetrate into the gallery region of the intercalate to react with the polymerizable monomers, oligomers or polymers previously co-intercalated in the interlayer gallery and form uniformly dispersed platelets or multi-layer intercalates or tactoids in a nanocomposite comprising the intercalate, and/or exfoliate thereof, and a matrix polymer.

In another embodiment of the present invention, the intercalate can be added into a polar organic compound or a polar organic compound-containing composition carrier or organic solvent to provide unexpectedly viscous carrier compositions, for delivery of the carrier or solvent, or for administration of an active compound that is dissolved or dispersed in the carrier or solvent. Such compositions, especially the high viscosity gels, are particularly useful for delivery of active compounds, such as oxidizing agents for hair waving lotions, and drugs for topical administration, since extremely high viscosities are obtainable; and for admixtures of the intercalate, or exfoliate thereof, with polar solvents in modifying rheology, e.g., of cosmetics, oil-well drilling fluids, paints, lubricants, especially food grade lubricants, in the production of lubricants, grease, and the like. Such intercalates and/or exfoliates also are especially useful in admixture with matrix thermoplastic or thermosetting polymers in the manufacture of nanocomposites for forming polymeric articles.

The intercalate-containing and/or exfoliate-containing organic liquid compositions can be in the form of a stable thixotropic gel that is not subject to phase separation and can be used to deliver any active materials, such as in the cosmetic, hair care and pharmaceutical industries. The layered material is intercalated by contact with a multi-charged spacing/coupling agent to form the novel organoclays. Simultaneous or later addition of a co-intercalant oligomer or polymer to the onium ion-intercalated layered material, such as by direct compounding in an extruder to co-intercalate the oligomer or polymer between adjacent spaced phyllosilicate platelets and optionally separate (exfoliate) the layered material into individual platelets, provides the co-intercalated layered material for admixture with a matrix polymer to form a nanocomposite composition.

Addition of the co-intercalate to a matrix polymer melt enhances one or more properties of the matrix polymer melt, such as strength or temperature resistance, and particularly gas impermeability; or mixing the intercalate or co-intercalate with a carrier or solvent material maintains and/or increases viscosity and thixotropy of the carrier material. The intercalates and co-intercalates of the present invention are easily, homogeneously and uniformly dispersed throughout the carrier or solvent to achieve new and unexpected viscosities in the carrier/platelet compositions even after addition of an active organic compound, such as a cosmetic component or a medicament, for administration of the active organic compound(s) from the composition. The co-intercalates of the present invention are easily, homogeneously and uniformly dispersed in a matrix polymer to provide new and unexpected gas barrier and strength properties to matrix polymers. The above and other aspects and advantages of the present invention will become more apparent from the following detailed description of the present invention, taken in conjunction with the drawings.

BRIEF DESCRIPTION OF THE DRAWINGS

FIG. 1A schematically shows a layered material platelet having a cationic charge density such that negative charge centers, and the corresponding associated cations (Na$^+$) are spaced a distance L. As shown in FIGS. 1B, 1C and 1D, multi-charged onium ions are able to ion exchange with the Na$^+$ cations at both adjacent Na$^+$ ions, while having carbon spacing molecules $R_1$, $R_2$, and $R_3$ of differing lengths, due to the negative change occupying a substantial radial distance of about 5 Å from the negative charge center ($R_1$, $<R_3=L<R_2$). Accordingly, the distance between the two positively charged atoms of the multi-charged onium ions ideally differ depending upon the charge density of the layered material.

DETAILED DESCRIPTION OF THE PREFERRED EMBODIMENTS

Figure 1A:
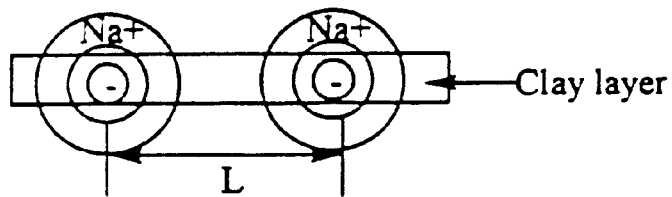
FIGS. 1A–1D are schematic side views of a portion of a Layered Material platelet showing two adjacent exchangeable Na$^+$ cations on the platelet surface and negative charge centers above the platelet surface directly under the Na$^+$ cations, showing the negative charges diffusing radially outwardly from the negative charge center, and showing di-positively charged onium ions, with different length spacing moieties bonded between the two positively charged (N$^+$) atoms ion-exchanged at different locations with respect to the negative charge centers.
Figure 1B:
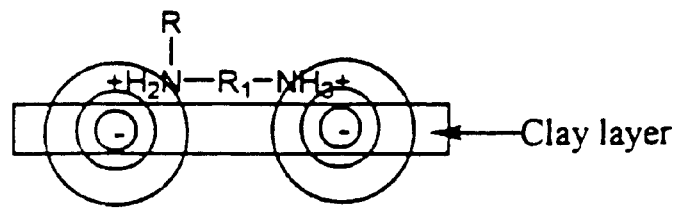
Figure 1C:
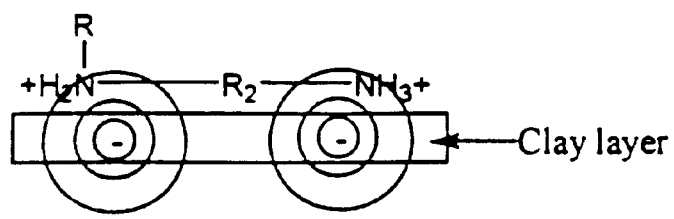
Figure 1D:
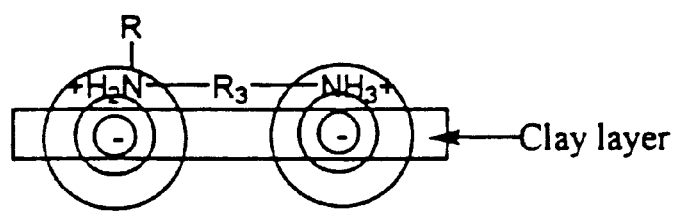
Figure 2A:
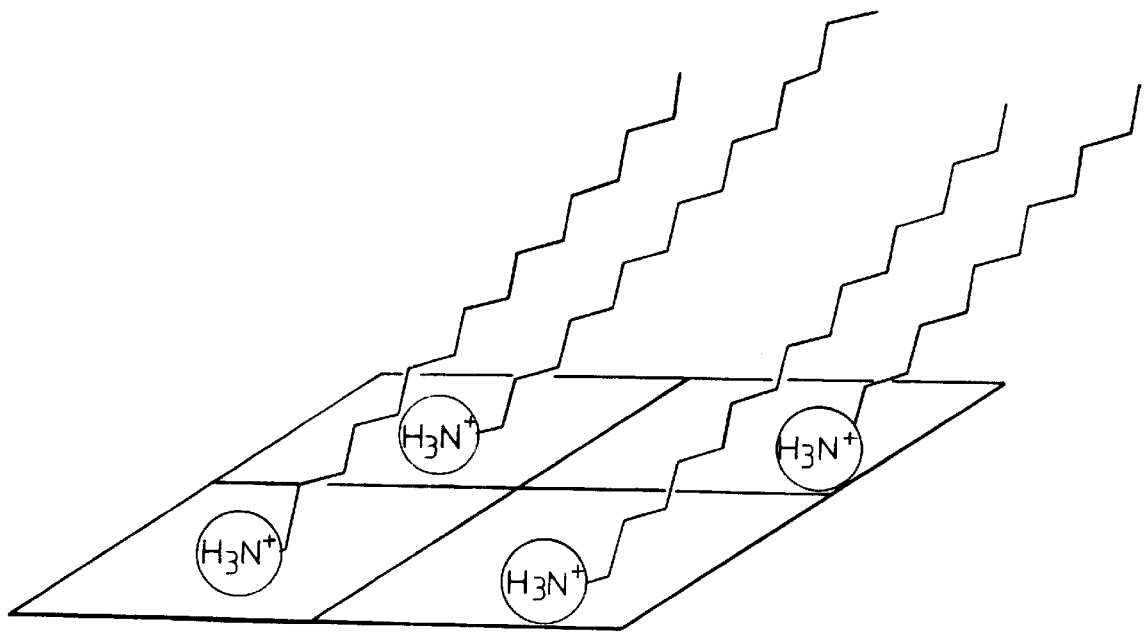
FIGS. 2A and 2B are schematic representations of layered material platelets intercalated with single-charged (tallow amine) and di-charged (tallow diamine) onium ions.
Figure 2B:
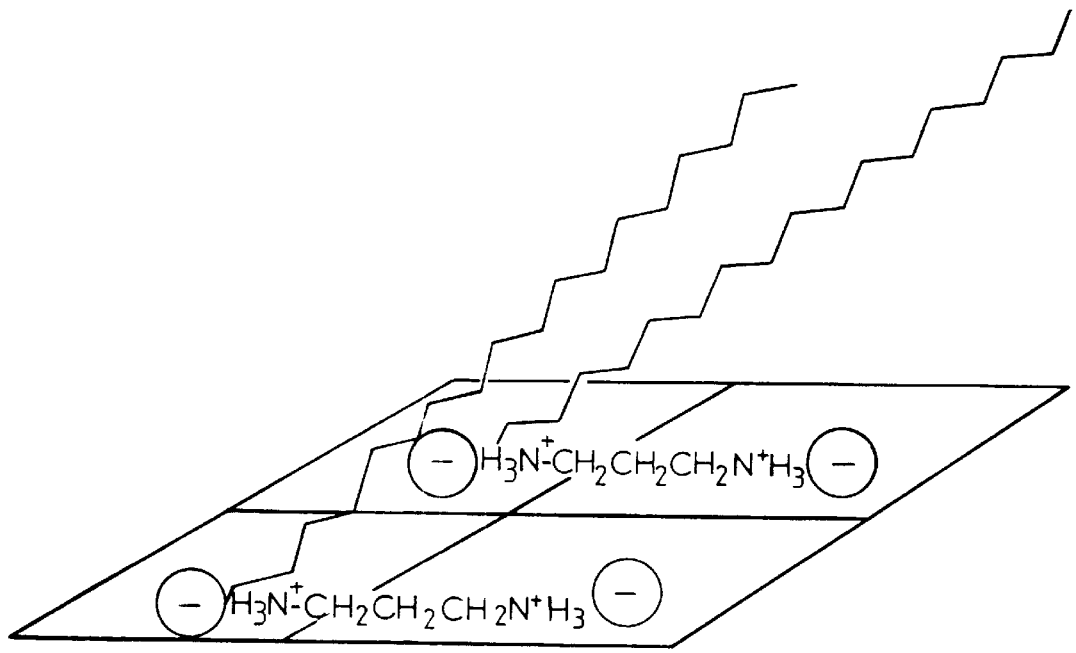

To form the intercalated and exfoliated materials of the present invention, the layered material, e.g., the phyllosilicate, should be swelled or intercalaed by sorption of a multi-charged spacing/coupling agent to form the organoclays of the present invention. To form the co-intercalated materials of the preferred nanocomposite embodiment of the present invention, the multi-charged onium ion-intercalated layered material is simultaneously or subsequently co-intercalated with a co-intercalant polymerizable monomer, polymerizable oligomer, or polymer.

Useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

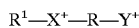

where X$^+$ and Y$^+$, same or different, are ammonium, sulfonium, phosphonium, or oxonium radicals such as $^\pm$NH$_3$, $^\pm$NH$_2$—, $^\pm$N(CH$_3$)$_3$, $^\pm$N(CH$_3$)$_2$—, $^\pm$N(CH$_3$)$_2$ (CH$_2$CH$_3$), $^\pm$N(CH$_3$)(CH$_2$CH$_3$)—, $^\pm$S(CH$_3$)$_3$, $^\pm$S(CH$_3$)$_2$—, $^\pm$P(CH$_3$)$_3$, $^\pm$P(CH$_3$)$_2$ —, $^\pm$NH$_4$, $^\pm$NH$_3$—, and the like; R is an organic spacing, backbone radical, straight or branched, preferably having from 2 to 24, more preferably 3 to 10 carbon atoms, in a backbone organic spacing molecule covalently bonded at its ends to charged N$^+$, P$^+$, S$^+$ and/or O$^+$ cations and R$^1$ can be hydrogen, or an alkyl radical of 1 to 22 carbon atoms, linear or branched, preferably having at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsulfinyl, aryloxy, alkylsulfinyl, alkylsulfonyl, arylthio, arylsulfinyl, alkoxycarbonyl, arylsulfonyl, or alkylsilane. Examples of R$^1$ include non-existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, pmethylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclo-octylene, cycloheptylene and the like; alkoxyalkylenes such as methoxy-methylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxy-ethylene, moieties of the formula $-C_3H_6COO-$, $-C_5H_{10}COO-$, $-C_7H_{10}COO-$, $-C_7H_{14}COO-$, $-C_9H_{18}COO-$, $-C_{11}H_{22}COO-$, $-C_{13}H_{26}COO-$, $-C_{15}H_{30}COO-$, and $-C_{17}H_{34}COO-$ and $-C=C(CH_3)COOCH_2CH_2-$, and the like. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

Sorption of the multi-charged spacing/coupling agent should be sufficient to achieve expansion of the interlayer spacing of adjacent platelets of the layered material (when measured dry) to at least about 10 Å, preferably to at least about 15 Å, and intercalation of both the multi-charged spacing/coupling agent and co-intercalant polymer should achieve an interlayer spacing to at least about 20 Å, preferably to at least about 25 Å, up to about 300 Å, usually up to about 100 Å.

The multi-charged spacing/coupling agent is introduced into the layered material galleries in the form of a solid or liquid in an intercalating composition containing the layered material (neat or aqueous, with or without an organic solvent, e.g., an aliphatic hydrocarbon, such as heptane, to, if necessary, aid to dissolve the multi-charged onium ion compound) having a multi-charged spacing/coupling agent concentration of at least about 2%, preferably at least about 5% by weight multi-charged spacing/coupling agent, more preferably at least about 50% to about 200% by weight multi-charged spacing/coupling agent in the intercalating composition, based on the dry weight of the layered material, for multi-charged onium ion spacing/coupling agent sorption and ion-exchange.

In the preferred embodiment, the layered material, e.g., smectite clay, is slurried in water and the multi-charged spacing/coupling agent (multi-charged cation) is dissolved in the clay slurry water, preferably at a molar ratio of multi-charged onium ion to clay interlayer cations of at least about 0.25:1, preferably at least about 0.5:1, more preferably at a molar ratio of at least about 1:1. The multi-charged spacing/coupling agent-intercalated clay then is separated from the water easily, since the layered material, e.g., clay, is now hydrophobic, and dried in an oven to less than 5% water, based on the dry weight of the layered material, preferably bone dry, before being compounded with the co-intercalant polymer and before compounding with a matrix polymer—preferably the same matrix polymer as the co-intercalant polymer.

The multi-charged spacing/coupling agent compound can be added as a solid with the addition to the layered material/multi-charged spacing/coupling agent compound blend of at least about 20% water, preferably at least about 30% water or more, based on the dry weight of layered material. Preferably about 30% to about 50% water, more preferably about 30% to about 40% water, based on the dry weight of the layered material, is included in the multi-charged spacing/coupling agent compound intercalating composition, so that less water is sorbed by the intercalate, thereby necessitating less drying energy after multi-charged spacing/coupling agent compound intercalation.

The preferred multi-charged spacing/coupling agent compounds are multi-onium ion compounds that include at least two positively charged atoms, each (same or different) selected from primary, secondary, tertiary or quaternary ammonium, phosphonium, sulfonium, and/or oxonium ions having Formula 1, as follows:

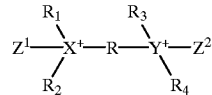

Formula 1 wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R_1$, $R_2$, $R_3$ and $R_4$. Also, one or both of $Z^1$ and $Z^2$ may include one or more positively charged atoms or onium ions.

Prior art organoclays used to intercalate clays have only been used with single-charged ammonium or phosphonium ions. The present invention discloses the first organoclay composition which uses multi-charged, preferably double-charged cationic onium ions, to prepare organoclays. In particular, the composition of the present invention is more suitable for polymer-clay nanocomposite preparation, such as in-reactor route and direct compounding route. The multi-charged cationic surfactants (onium ions that have at least 1 radical bonded to one of the charged atoms that has a length of at least $C_6$ up to about $C_{24}$. are preferred and are commercially available at a very reasonable cost, and can provide complete ion-exchange for the interlayer cations using much less onium ion material, leaving more room for co-intercalation of a polymer, as shown in Table I.

TABLE I

| Chemical | MW | Charge | Load in Nanomer (wt %) |
|---|---|---|---|
| Tallow Amine (TA) | 265 | Mono | 26.5 |
| Tallow Diamine (TDA) | 330 | Dual | 18.8 |
| E185 | 480 | Mono | 40.0 |
| EDT3 | 480 | Dual | 25.0 |

The above dual-charged onium ion-intercalated organoclays of the present invention have been prepared by the di-charged onium ion-exchange reaction process. Surprisingly, both of the charged atoms of the tallow diamine intercalant ion-exchanged on the same platelet surface of the smectite clay and did not bridge between adjacent platelet surfaces. To achieve the full advantage of the present invention, the distance between at least two of the spaced charged atoms of the multi-charged onium ions should be in the range (within about 6 Å) of the average distance between two exchangeable cations or adjacent negative charges on the clay platelet surface. For example, the average area occupied by a negative charge of a montmorillonite clay with a C.E.C. of 140 milleq./100 g is in the range of 70–80 Å$^2$. Therefore, the average distance of the adjacent charge is in the range of 8–9 Å. The distance between the two charged ammonium groups in tallow diamine, wherein the two charged nitrogen atoms (N$^+$) are spaced by three carbon atoms, is about 8 Å.

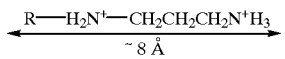

The two charged amine groups of a tallow diamine molecule, therefore, are each disposed within about 6 Å of a negative charge center when each replaces an adjacent exchangeable cation (in this case, each N$^+$ is within about 1 Å of a negative charge center) on the same silicate platelet surface, with the tallow (R) radical extending upwardly from the platelet surface, as shown in FIGS. 2A, 2B, 3A and 3B.

Figure 3A:
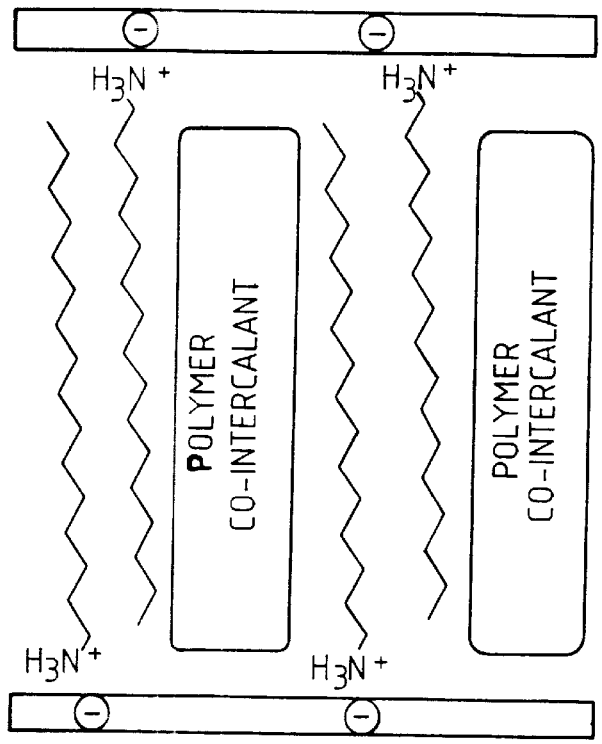
FIGS. 3A and 3B are schematic representations of adjacent layered material platelets intercalated with single- and double-charged onium ions, as in FIGS. 2A and 2B, and co-interated with a polymer co-intercalant.
Figure 3B:
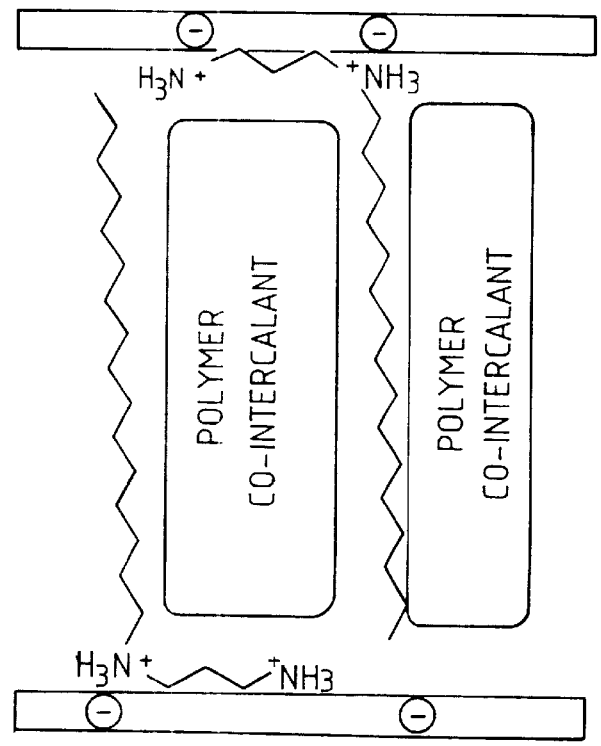

FIGS. 3A and 3B shows the schematic difference between organoclays prepared by using single, and double-charged onium ions. The hydrophobic (tallow) tails of the double-charged surfactants will allow intercalation of oligomer and polymer guest molecules to intercalate into the clay galleries just like the single-charged onium ion-exchanged organoclays. The degree of intercalation of the co-intercalant polymer molecules into the single- or double-onium ion organoclay galleries can be assumed to be the same, based on the fact, which is the controlling factor in intercalation, that the chain length of both intercalants is the same. However, due to the fact that the number of long (tallow) tails of the di-charged onium ions is reduced to 50%, the volume occupied by the co-intercalant polymer molecules will be substantially increased, as shown schematically in FIGS. 3A and 3B.

Examples of the preferred commercially available multi-charged onium surfactants include the following:

Tallow Diamine (TDA)

Duoquad T50 (T50)

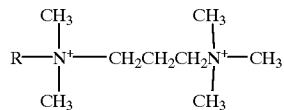

EDT-3, or Ethouomeen T13 (E-DT-3)

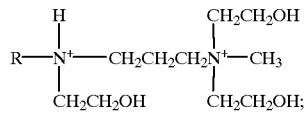

DA-16/18

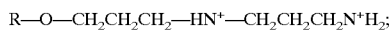

Tallow Triamine (T3)

Tallow Tetramine (T4)

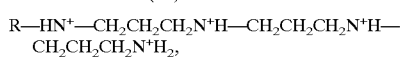

wherein R=C$_{14}$–C$_{18}$ alkyl chain.

The results of intercalation of monomers and polymers to the multi-charged onium ion-exchanged organoclay indicate that there is no locking of the adjacent clay silicate layers by using multi-charged onium ion intercalants.

Any swellable layered material that sufficiently sorbs the multi-charged onium ion spacing/coupling agent to increase the interlayer spacing between adjacent phyllosilicate platelets at least 3 Å, preferably at least 5 Å, to at least about 10 Å, preferably to at least about 15 Å can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" or "interlaminar spacing" refers to the distance between the internal faces of the adjacent layers as they are assembled in the layered material before any delamination (exfoliation) takes place.

The amount of multi-charged spacing/coupling agent intercalated into the swellable layered materials, in order that the intercalated layered material platelet surfaces sufficiently ion-exchange with the multi-charged spacing/coupling agent molecules such that adjacent platelets of the layered material may be sufficiently spaced for easy co-intercalation of a polymeric or polymerizable co-intercalant, may vary substantially between about 2%, preferably at least about 10%, and up to about 200%, based on the dry weight of the layered material.

The multi-charged onium ion spacing/coupling agent intercalant and co-intercalant polymer may be introduced into (sorbed within) the interlayer spaces of the layered material in a number of ways. In a preferred method of intercalating the multi-charged onium ion spacing/coupling agent between adjacent platelets of the layered material, the layered material is slurried in water, e.g., at 5–20% by weight layered material and 80–95% by weight water, and the multi-charged spacing/coupling agent compound is dissolved or dispersed in the water in which the layered material is slurried. If necessary, the multi-charged spacing/coupling agent compound can be dissolved first in an organic solvent, e.g., propanol. The layered material then is separated from the slurry water and dried prior to compounding with the co-intercalant polymer for intercalation of the co-intercalant and to form the nanocomposite material in a matrix polymer, preferably the same matrix polymer as the co-intercalant polymer. In a preferred method of intercalating the co-intercalant as an oligomer or polymer, the multi-charged spacing/coupling agent-intercalated layered material is intimately mixed with the co-intercalant oligomer or polymer melt, e.g., by extrusion or pug milling, to form an intercalating composition comprising the multi-charged spacing/coupling agent-intercalated layered material and co-intercalant oligomer or polymer.

The resulting multi-charged spacing/coupling agent intercalated layered material has interior platelet surfaces that are sufficiently hydrophobic and sufficiently spaced for intercalation of the co-intercalant polymer. The multi-charged spacing/coupling agent carrier (preferably water, with or without an organic solvent) can be added by first solubilizing or dispersing the multi-charged spacing/coupling agent compound in the carrier; or a dry multi-charged spacing/coupling agent compound and relatively dry layered material (preferably containing at least about 4% by weight water) can be blended and the intercalating carrier added to the blend, or to the layered material prior to adding the dry multi-charged spacing/coupling agent. When intercalating the layered material with multi-charged spacing/coupling agent in slurry form (e.g., 900 pounds water, 100 pounds layered material, 100 pounds, multi-charged spacing/coupling agent compound, the amount of water can vary substantially, e.g., from about 4% by weight, preferably from a minimum of at least about 30% by weight water, with no upper limit to the amount of water in the intercalating composition (the intercalate is easily separated from the intercalating composition due to its hydrophobicity after multi-charged spacing/coupling agent intercalation).

Alternatively, the multi-charged spacing/coupling agent intercalating carrier, e.g., water, with or without an organic solvent, can be added directly to the layered material, i.e., the phyllosilicate, prior to adding the multi-charged spacing/coupling agent compound, either dry or in solution. Sorption of the multi-charged spacing/coupling agent compound molecules may be performed by exposing the layered material to a dry or liquid multi-charged spacing/coupling agent compound in the multi-charged spacing/coupling agent intercalating composition.

In accordance with another method of intercalating the multi-charged spacing/coupling agent and co-intercalant between the platelets of the layered material, the layered material, preferably containing at least about 4% by weight water, e.g., about 10% to about 15% by weight water, is blended with water and/or organic solvent solution of a multi-charged spacing/coupling agent compound. The multi-charged spacing/coupling agent compound can be intercalated into the layered material simultaneously with the intercalation of a co-intercalant polymer, or the co-intercalant polymer may be intercalated after intercalation of the multi-charged spacing/coupling agent. The dry multi-charged spacing/coupling agent intercalated layered material then is extruded with the co-intercalant oligomer or polymer melt for direct compounding, with intercalation of the co-intercalant polymer into the multi-charged spacing/coupling agent-intercalated layered material.

The multi-charged spacing/coupling agents have an affinity for the phyllosilicate at both, properly spaced, charged atoms to bridge adjacent negative charge sites on a platelet surface so that the multi-charged spacing/coupling agents are sorbed onto a single platelet surface, and are maintained bonded to the inner surfaces of the silicate platelets, in the interlayer spaces, after exfoliation.

It is preferred that the intercalate loading be less than about 10% for purposes of increasing the viscosity of an organic liquid carrier. Intercalate loadings within the range of about 0.05% to about 40% by weight, preferably about 0.5% to about 20%, more preferably about 1% to about 10% significantly enhances viscosity. In general, the amount of intercalate and/or exfoliated particles thereof incorporated into a liquid carrier, such as a polar solvent, e.g., a glycol such as glycerol, is less than about 90% by weight of the mixture, and preferably from about 0.01% to about 80% by weight of the is composite material mixture, more preferably from about 0.05% to about 40% by weight of the mixture, and most preferably from about 0.05% to about 20% or 0.05% to about 10% by weight.

In accordance with a preferred embodiment of the present invention, the co-intercalated layered material can be co-intercalated with any oligomer or polymer and then dispersed into one or more melt-processible thermoplastic and/or thermosetting matrix oligomers or polymers, or mixtures thereof, by direct compounding. Matrix polymers for use in this embodiment of the process of this invention may vary widely, the only requirement is that they are melt processible. In this embodiment of the invention, the polymer includes at least ten (10), preferably at least thirty (30) recurring monomeric units. The upper limit to the number of recurring monomeric units is not critical, provided that the melt index of the matrix polymer is such that the matrix polymer forms a flowable mixture. Most preferably, the matrix polymer is intercalated into the di-charged spacing/coupling agent-intercalated layered material simultaneously with dispersing the co-intercalated polymer uniformly into the matrix polymer. The matrix polymer preferably includes from at least about 10 to about 100 recurring monomeric units, and preferably is the same oligomer or polymer as the co-intercalant. In the most preferred embodiments of this invention, the number of recurring units is such that the matrix polymer has a melt index of from about 0.01 to about 12 grams per 10 minutes at the processing temperature.

MXD6 nylon, obtained from Mitsubishi Gas Chemical Company, Inc., Tokyo, Japan is a polymer having the following Formula 2:

Formula 2

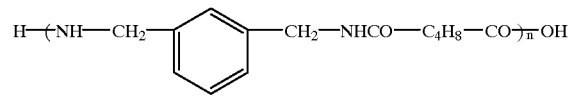

wherein
n for the monomer=1;
n for the oligomer=2–10; and
n for the polymer=11–20,000,
preferably 11–1,000,
more preferably 11–500.

Other thermoplastic resins and rubbers for use as matrix monomers, oligomers or polymers in the practice of this invention may vary widely. Illustrative of useful thermoplastic resins, which may be used alone or in admixture, are polyactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly (tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl)

carbonate], poly[1,1-ether bis(4-phenyl) carbonate], poly [diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly (6-aminohexanoic acid), poly(m-xylylene adipamide), poly (p-xylylene sebacamide), poly(2,2,2-trimethyl hexamethylene terephthalamide), poly(metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly (ethylene oxybenzoate) (A-TELL), poly(para-hydroxy benzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4phenylene oxide), poly(2,6diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), polypropylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexyl-methane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, polybutadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly (styrene)-poly(butadiene)-poly(styrene) block copolymer manufactured by Shell Chemical Company under the trade name KRATON®.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, particularly nylons, most particularly MXD6 nylon. Polyamides which may be used as matrix polymers in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

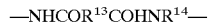

—NHCOR$^{13}$COHNR$^{14}$— in which R$^{13}$ is an alkylene group of at least 2 carbon atoms, preferably from about 2 to about 11; or arylene having at least about 6 carbon atoms, preferably about 6 to about 17 carbon atoms; and R$^{14}$ is selected from R$^{13}$ and aryl groups.

Also, included are copolyamides and terpolyamides obtained by known methods, for example, by condensation of hexamethylene diamine or metaxylylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly (hexamethylene terephthalamide), poly(heptamethylene pimelamide) (nylon 7,7), poly(octamethylene sebacamide) (nylon 8,8), poly(nonamethylene azelamide) (nylon 9,9) poly(decamethylene azelamide) (nylon 10,9), poly (decamethylene sebacamide) (nylon 10,10), poly[bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly (piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Other matrix or host polymers which may be employed in admixture with the di-charged spacing/coupling agent intercalant and co-intercalant polymer of the present invention to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly (ethylene terephthalate), poly(cyclohexylenedimethylene terephthalate), poly(ethylene dodecate), poly(butylene terephthalate), poly[ethylene(2,7-naphthalate)], poly (methaphenylene isophthalate), poly(glycolic acid), poly (ethylene succinate), poly(ethylene adipate), poly(ethylene sebacate), poly(decamethylene azelate), poly (decamethylene adipate), poly(decamethylene sebacate), poly(dimethylpropiolactone), poly(para-hydroxybenzoate) (EKONOL), poly(ethylene oxybenzoate) (A-tell), poly (ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly (ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and a o-phthalic acid, 1,3-naphthalene-dicarboxylic acid, 1,4-naphthalenedicarboxylic acid, 2,6-naphthalenedicarboxylic acid, 2,7-naphthalene-dicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalc acid, orthophthalic acid) are preferred for use in the practice of this invention. Among these preferred acid precursors, terephthalic acid is particularly preferred acid precursor.

Still other useful thermoplastic homopolymers and copolymer matrix polymers for forming nanocomposites with the co-intercalated layered materials of the present invention are polymers formed by polymerization alpha-beta-unsaturated monomers or the formula:

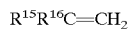

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are polypropylene), propylene copolymers, poly (ethylene) and ethylene copolymers. More preferred are poly(ethylene) and polypropylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of intercalated layered material included in the liquid carrier or solvent compositions to form the viscous compositions suitable to deliver the carrier or some carrier-dissolved or carrier-dispersed active material, such as a pharmaceutical, may vary widely depending on the intended use and desired viscosity of the composition. For example, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 25° C. to about 200° C., preferably about 75° C. to about 100° C. It is preferred that the intercalate or platelet loading be less than about 10% by weight of the composition. Intercalate or platelet particle loadings within the range of about 0.01% to about 40% by weight, preferably about 0.05% to about 20%, more preferably about 0.5% to about 10% of the total weight of the composition significantly increases the viscosity of the composition. In general, the amount of intercalate and/or platelet particles incorporated into the carrier/solvent is less than about 20% by weight of the total composition, and preferably from about 0.05% to about 20% by weight of the composition, more preferably from about 0.01% to about 10% by weight of the composition, and most preferably from about 0.01% to about 5%, based on the total weight of the composition.

In accordance with an important feature of the present invention, the intercalate and/or platelet/carrier compositions of the present invention can be manufactured in a concentrated form, e.g., as a master gel, e.g., having about 10–90%, preferably about 20–80% intercalate and/or exfoliated platelets of layered material and about 10–90%, preferably about 20–80% carrier/solvent. The master gel can be later diluted and mixed with additional carrier or solvent to reduce the viscosity of the composition to a desired level.

In one embodiment, the intercalates, and/or exfoliates thereof, are mixed with a carrier or solvent to produce viscous compositions of the carrier or solvent optionally including one or more active compounds, such as an antiperspirant compound, dissolved or dispersed in the carrier or solvent.

When shear is employed for exfoliation, any method which can be used to apply a shear to the intercalate/matrix polymer nanocomposite composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

In accordance with an important feature of the present invention, it has been found that the multi-charged spacing/coupling agent-intercalated clay can be co-intercalated with an oligomer or polymer by direct compounding, i.e., by mixing the multi-charged onium ion-intercalated clay directly with the co-intercalant oligomer or polymer in an extruder to make the co-intercalated clay without significant exfoliation of the clay platelets. The co-intercalate-filled matrix polymer extrudes into a homogeneous transparent film with excellent dispersion of the co-intercalate, and/or exfoliate thereof. The co-intercalate, and/or exfoliate thereof, dispersed within the matrix polymer may be predominantly in the form of multi-layer tactoids dispersed in the matrix polymer. The tactoids have the thickness of at least two individual platelet layers plus the ion-exchanged di-charged intercalant spacing/coupling agent and one to five monolayer thicknesses of the co-intercalant polymer, and include small multiples or aggregates of less than about 10 platelets, in a coplanar aggregate, preferably less than about 5, more preferably less than about 3 platelet layers, still more preferably 2 or 3 platelet layers having the multi-charged spacing/coupling agent compound and co-intercalant polymer between platelet surface(s). The nanocomposite compositions, including the matrix polymer, can include the layered material as all intercalates, completely without exfoliation, while maintaining transparency, excellent intercalate dispersibility, and excellent gas impermeability.

Molding compositions comprising a matrix polymer containing a desired loading of the co-intercalates of the present invention, and/or individual platelets obtained from exfoliation of the co-intercalates manufactured according to the present invention, are outstandingly suitable for the production of sheets, films and panels having valuable properties. Such sheets, films and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. Beverage containers, e.g., plastic beer/wine bottles having new and unexpected shelf life are possible using matrix polymers filled with, e.g., 1–10% by weight of the co-intercalates of the present invention, either as a sole layer, or secured to or between one or more other layers, as known in the art. The sheets, films and panels can be laminated to other plastic films, sheets or panels and this is preferably effected by co-extrusion, the sheets being bonded in the molten state. The surfaces of the sheets, films and panels, including those in the embossed form, can be improved or finished by conventional methods, for example by lacquering or by the application of protective films.

Matrix polymer/intercalate composite materials are especially useful for fabrication of extruded films and film laminates, as for example, films for use in food packaging that have low $O_2$ permeabilities. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed intercalate, and/or exfoliated platelets thereof, which has been co-intercalated in accordance with the present invention, and a matrix polymer can be formed into a film by suitable film-forming methods. Typically, the composition is melted and forced through a film forming die after oligomer or polymer co-intercalation and compounding. The film of the nanocomposite may go through sequential steps to cause the intercalate and/or exfoliated platelets thereof to be further oriented so the major planes through the co-intercalates and/or platelets thereof are substantially parallel to the major plane through the film. One method to accomplish this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits in addition to decreased permeability to gases, particularly $O_2$: increased modulus; increased wet strength; increased dimensional stability; and decreased moisture adsorption.

The following examples are presented to more particularly illustrate the invention and are not to be construed as limiting the scope of the invention.

EXAMPLE 1

This example demonstrates the formation of a double-charged onium ion-modified (organophilic) montmorillonite clay. The onium ion is a neutral amine (primary and secondary) and can be protonated by contact with HCl.

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75° C. to 80° C. 26.4 g of Tallow di-amine, available from Tomah Products, was mixed with 70 ml, 2 N HCl in 1 liter of 75° C. to 80° C. de-ionized water. The amine-HCl solution was introduced to the clay dispersion, followed by vigorous mixing. The mixture was maintained at 75° C. to 80° C. for about 30 min., followed by a de-watering process, such as filtration. The filter cake was re-dispersed into 4 liters of 75° C. to 80° C. water and the solid (filter cake) was collected and placed into a 75° C. to 80° C. oven to dry followed by particle size reduction. The filter cake also can be freeze-dried. The dried material has a d001 spacing of 17 Å as measured by X-ray diffraction and was coded as TDA-2H-PGW. Tallow amine also can be used to prepare treated montmorillonite with essentially the same procedure, but with a higher amount of Tallow amine, e.g., 37.1 grams. The product is coded as TA-PGW, with a d001 spacing of 22 Å.

EXAMPLE 2

This example demonstrates the formation of a double-charged onium-ion modified (organophilic) montmorillonite clay. The onium ion is a neutral amine (tertiary) and can be protonated with contact with HCl.

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75° C. to 80° C. 33.6 g of E-DT-3 amine, available from Tomah Products, was mixed with 70 ml, 2 N HCl in 1 liter of 75° C. to 80° C. de-ionized water. The amine-HCl solution was introduced to the clay dispersion, followed by vigorous mixing. The mixture was maintained at 75° C. to 80° C. for about 30 min., followed by a de-watering process, such as filtration. The filter cake was re-dispersed into 4 liters of 75° C. to 80° C. water and the solid (filter cake) was collected and placed into a 75° C. to 80° C. oven to dry followed by particle size reduction. The filter cake also can be freeze-dried. The dried material has a d001 spacing of 17 Å as measured by X-ray diffraction and was coded as ETD-32H-PGW.

EXAMPLE 3

This example demonstrates the formation of a double-charged onium ion-modified (organophilic) montmorillonite clay. The onium ion is a double-charged quaternary ammonium cation.

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75° C. to 80° C. 67.2 g of DuoquadT50 (50% solid), available from Akzo Nobel, was mixed with 1 liter of 75° C. to 80° C. de-ionized water. The T50 solution was introduced to the clay dispersion followed by vigorous mixing. The mixture was maintained at 75° C. to 80° C. for about 30 min., followed by a de-watering process, such as filtration. The filter cake was re-dispersed into 4 liters of 75° C. to 80° C. water and the solid was collected and placed into a 75° C. to 80° C. oven to dry followed by particle size reduction. The filter cake also can be freeze-dried. The dried material has a d001 spacing of 19 A as measured by X-ray diffraction and was coded as T50-PGW.

EXAMPLES 4–6

These examples illustrate the formation of clay intercalates by combining the multi-charged onium ion-modified (organophilic) clays with non-polymeric organic compounds.

5 grams of the products of Examples 1–3, TDA-2H-PGW, TA-PGW, E-DT-32H-PGW, and T50PGW were mixed with 45 grams of the following non-polymeric organic compounds, ε-caprolactam at 70° C. to 90° C., DGEBA DER331 at 70° C. to 80° C. and Resorcinol bis(diphenyl phosphate) (RDP, Akzo Nobel) at 70° C. to 80° C. The mixtures were cooled to room temperature and placed on a microscopic glass slide to measure X-ray diffraction patterns. The results are given in the Table 1. The intercalates of the multi-charged onium ion-treated clay with the non-polymeric organic compounds also can be formed by mixing the non-polymeric organic compounds with the filter cake followed by de-watering, drying and particle size reduction. The d001 results are nearly identical to the results generated from dispersion route of Examples 1–3. The results in Table 1 indicate successful intercalation of non-polymeric organic compounds into the interlayer spacing of the multi-charged onium ion-treated clays. The multi-charged onium ion-treated clays perform similarly to the normal organoclays. The long aliphatic tails ($C_6+$) of the preferred multi-charged onium ions provide exceptional degrees of intercalation.

TABLE 1

$d_{001}$ results of the multi-charged onium ion-modified clays dispersed in non-polymeric organic compounds by X-ray diffraction.

| Examples | Clays | $d_{001}$ (Å) in clay | $d_{001}$ (Å) in caprolactam | $d_{001}$ (Å) in DER331 | $d_{001}$ (Å) in RDP |
|---|---|---|---|---|---|
| 4 | TDA-2H-PGW | 16 | 33 | 34 | 34 |
| 4 | TA-PGW | 22 | 32 | 36 | 33 |
| 5 | E-DT-3-2H-PGW | 18 | 33 | 38 | 35 |
| 6 | T50-PGW | 19 | 32 | 36 | 34 |
| Comparative 1 | PGW | 13 | 13 | 13 | 13 |

COMPARATIVE EXAMPLE 1

For comparison, 5 grams of the untreated Na-montmorillonite clay (PGW) was mixed with the above-mentioned non-polymeric organic compounds, and its mixtures were examined by X-ray diffraction. The result is included in Table 1. No intercalation of the organic molecules was observed.

EXAMPLES 7–9

These examples illustrate the formation of a polymer-clay nanocomposite by melt compounding.

Melt compounding was used to prepare polymer clay nanocomposites. Thermoplastic resins, Nylon6 (PA6), Poly methyl methacrylate (PMMA) and Nylon MXD6 (MXD6) were selected as the matrices. Resin pellets and multi-charged onium ion-intercalated clay were fed into a twin screw extruder (Leistritz Micro27) at elevated temperatures (above the melting points of the resins), e.g., for PMMA the temperatures of the extruder zones were in the range of 210° C. to 230° C. The ratio of the multi-charged onium ion-intercalated clays to the resins were controlled at 5:95 by weight. The compounded composite strings from the extruder were cooled in a cold water bath prior to being pelletized. The nanocomposite of PA6, and MXD6 were cast to 2 mil-thick films and OTR (Oxygen Transmittance Rate) results were measured at 65% RH at 23° C. by using a Mocon OX-Tran2/20. PMMA-clay nanocomposites were molded into ASTM standard testing specimens to test HDT (Heat Deflection Temperature). The dispersion results of the multi-charged onium ion-treated clays in the above-mentioned resins are listed in Table 2. X-ray diffraction patterns were obtained from the PA6-clay, MXD6-clay film nanocomposites and PMMA-clay nanocomposite bar. The X-ray diffraction results are shown in Table 3.

TABLE 2

The observation of the clay dispersion of the multi-charged onium ion-treated clays and Na-montmorillonite clay (PGW) in Nylon6 (PA6), Poly (methyl methacrylate) (PMMA) and Nylon MXD6 (MXD6).

| Examples | Clays | PA6 | PMMA | MXD6 |
|---|---|---|---|---|
| 7 | TDA-2H-PGW | excellent | excellent | excellent |
| 8 | E-DT-3-2H-PGW | very good | excellent | excellent |
| 9 | T50-PGW | very good | very good | excellent |
| Comparative 2 | PGW | poor | poor | poor |

Excellent: The extruded pellets and cast films are almost transparent and no particles were observed by optical microscope at ×100.
Very good: The extruded pellets and cast films are slightly opaque and no particles were observed by optical microscope at ×100.
Good: The extruded pellets and cast films are opaque and gel-body like particles were observed by optical microscope at ×100.
Poor: The pellets have visible particles, and are hazy. The film cast from the pellets have a visible discontinues phase and voids.

The melted resin polymers are intercalated into the multi-charged onium ion-treated clays to form resin-clay nanocomposites in the extrusion process. The X-ray diffraction results indicate that the original clay layer stacking has been interrupted by the resin intercalation. The OTR results of the PA6, and MXD6 nanocomposites have more than 30% reduction compared with the unfilled resins, respectively. The HDT of the PMMA nanocomposite increases nearly 10° C. over the pure PMMA resin.

TABLE 3

$d_{001}$ results of nanocomposite containing the multi-charged onium ion-treated clays dispersed in thermoplastic resins through melt compounding by X-ray diffraction.

| Examples | Clays | $d_{001}$ (Å) clay | $d_{001}$ (Å) in PA6 | $d_{001}$ (Å) in PMMA | $d_{001}$ (Å) in MXD6 |
|---|---|---|---|---|---|
| 7 | TDA-2H-PGW | 16 | >31 | 32 | >33 |
| 8 | E-DT-3-2H-PGW | 18 | >30 | 33 | >32 |
| 9 | T50-PGW | 19 | >34 | 34 | >33 |
| Comparative 2 | PGW | 13 | 11 | 12 | 11 |

COMPARATIVE EXAMPLE 2

For comparison, 5 wt % of the untreated Na-montmorillonite clay (PGW) was compounded with Nylon6 (PA6), Poly (methyl methacrylate) (PMMA) and Nylon MXD6 (MXD6) using the same conditions as for the multi-charged onium ion-treated clays. The resins filled with untreated PGW have very poor dispersion (Table 2). The cast films have visible voids, and the molded sample bars have rough surfaces and clay aggregates. The X-ray diffraction results (Table 3) indicate no intercalation of polymer resins into the clay interlayer spacing. Also, the dehydration (drying) of the clay collapsed the clay galleries in the heated extrusion process.

EXAMPLE 10

This example illustrates the formation of a Nylon6-TDA-2H-PGW nanocomposite through a caprolactam polymerization route.

70 g of TDA-2H-PGW was mixed with 2,000 grams of caprolactam at 80° C. overnight, prior to being placed into a reactor. The reactor is equipped with constant speed pedal mixer and purged with nitrogen. The reaction time is 12 hr. at 260° C. The reaction product was broken into small pieces with liquid nitrogen cooling and washed in boiling water to remove residual caprolactam. A 2 mil-thick film was cast and OTR was measured on the Mocon OX-Tran 2/20. The nanocomposite containing TA-PGW was prepared by the same method. The comparison of OTR results of the unfilled resin and nanocomposites is shown in Table 4.

TABLE 4

Comparison of OTR of Nylon6-clay nanocomposites prepared with traditional onium ion-treated clay (TA-PGW) and the multi-charged onium ion-treated clay (TDA-2H-PGW).

| Sample Name | Clay, wt % | OTR (cc-mil/100 in²/day) | % change |
|---|---|---|---|
| Control | 0.0 | 3.24 | 100% |
| TA-PGW | 2.0 | 2.11 | −35% |
| TDA-2H-PGW | 2.4 | 1.40 | −57% |

The nanocomposite prepared from the multi-charged onium ion-treated clay has significantly reduced oxygen permeability compared with the traditional (single charged onium ion) treated clay. Also, other mechanical, thermal and solvent resistance properties are better than those of the nanocomposites prepared from the traditional single charged onium ion-treated clays.

What is claimed is:

1. A surface-modified smectite clay comprising stacked layers of smectite clay silicate platelets having at the platelet internal surfaces, a multi-charged onium ion selected from the group consisting of di-ammonium, di-sulfonium, di-oxonium; ammonium/phosphonium; ammonium/sulfonium; ammonium/oxonium; phosphonium/-sulfonium; phosphonium/oxonium; sulfonium/oxonium; and mixtures thereof, intercalated and ion-exchanged in place of multiple interlayer cations.

2. The surface-modified smectite clay of claim 1, wherein the interlayer cations are substituted with multi-charged onium ions in a molar ratio of at least 0.25 moles of multi-charged onium ions per mole of interlayer exchangeable cations, to expand the interlayer spacing of the clay silicate platelets at least about 3 Å.

3. The surface-modified smectite clay of claim 2, wherein the molar ratio of multi-charged onium ions to clay interlayer exchangeable cations is at least 0.5:1.

4. The surface-modified smectite clay of claim 3, wherein the molar ratio of multi-charged onium ions to clay interlayer exchangeable cations is at least 1:1.

5. A method of intercalating a smectite clay with multi-charged onium ions comprising ion-exchanging multi-charged onium ions with the smectite clay to substitute the multi-charged onium ions in place of clay interlayer cations, wherein the multi-charged onium ions are selected from the group consisting of di-ammonium, di-sulfonium, di-oxonium; ammonium/phosphonium; ammonium/sulfonium; ammonium/oxonium; phosphonium/sulfonium; phosphonium/oxonium; sulfonium/oxonium; and mixtures thereof.

6. A method in accordance with claim 5, wherein the ion-exchange is achieved by dispersing the smectite clay and the multi-charged onium ions in a carrier comprising water to contact the smectite clay with the multi-charged onum ions for a time sufficient to ion-exchange the multi-charged onium ions for at least a portion of the smectite clay interlayer cations;

separating the ion-exchanged smectite clay from the carrier;

drying the ion-exchanged smectite clay; and grinding the smectite clay to a desired particle size distribution.

7. A method in accordance with claim 6, wherein the multi-charged onium ions are dispersed in the carrier at a molar ratio of multi-charged onium ions:smectite clay interlayer exchangeable cations of at least 0.25:1.

8. A method in accordance with claim 7, wherein the multi-charged onium ions are dispersed in the carrier at a molar ratio of multi-charged onium ions:smectite clay interlayer exchangeable cations of at least 0.50:1.

9. A method in accordance with claim 8, wherein the multi-charged onium ions are dispersed in the carrier at a molar ratio of multi-charged onium ions:smectite clay interlayer exchangeable cations of at least 1:1.

10. The method of claim 5, wherein the onium ion includes two positively charged atoms separated by 5 Å to 24 Å.

11. The method of claim 10, wherein the onium ion includes an organic radical covalently bonded to one of the positively charged atoms having a chain length of at least 6 carbon atoms.

12. The method of claim 10, wherein the 5 Å to 24 Å spacing between positively charged atoms is achieved by a separating moiety having 3 to about 12 carbon atoms in its backbone.

13. The method of claim 5, wherein the multi-charged onium ion is a compound of the formula:

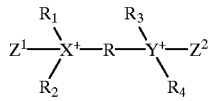

wherein R is an alkylene, aralkylene or substituted alkylene spacing moiety, ranging from $C_3$ to $C_{24}$, straight or branched chain; $R_1$, $R_2$, $R_3$ and $R_4$ are moieties, same or different, selected from the group consisting of hydrogen, alkyl, aralkyl, benzyl, substituted benzyl, straight or branched chain alkyl-substituted and halogen-substituted; ethoxylated alkyl; propoxylated alkyl; ethoxylated benzyl; propoxylated benzyl; $Z^1$ and $Z^2$, same or different, are selected from the group consisting of non-existent and any of the moieties as defined for $R_1$, $R_2$, $R_3$ and $R_4$.

14. The method of claim 13, wherein $Z^1$ or $Z^2$ is positively charged.

15. A composite material comprising a matrix polymer, and the organoclay of claim 1.

16. The composite material of claim 15, wherein the matrix polymer is a polyamide oligomer or polymer.

17. The composite material of claim 15, wherein the onium ion includes two positively charged nitrogen atoms separated by 5 Å to 24 Å.

18. The composite material of claim 17, wherein the onium ion includes an organic radical covalently bonded to one of the positively charged atoms, said organic radical having a chain length of at least six carbon atoms.

19. A nanocomposite composition comprising about 0.05 weight percent to about 40 weight percent of a smectite clay intercalated with a multi-charged onium ion spacing agent and about 60 weight percent to about 99.95 weight percent of a matrix polymer, wherein the intercalated smectite clay is dispersed uniformly throughout the matrix polymer.

20. A nanocomposite composition in accordance with claim 19, wherein the matrix polymer is co-intercalated into the smectite clay.

21. A nanocomposite composition in accordance with claim 20, wherein the matrix polymer is co-intercalated into the smectite clay while dispersing the layered material throughout the matrix polymer.

22. A nanocomposite composition in accordance with claim 20, wherein the matrix polymer is co-intercalated into the smectite clay prior to dispersing the smectite clay throughout the matrix polymer.

23. A nanocomposite composition in accordance with claim 19, wherein the matrix polymer is a polymer or oligomer of the reaction product of meta-xylylene diamine and adipic acid.

24. A nanocomposite composition in accordance with claim 19, wherein the multi-charged onium ions include at least one moiety covalently bonded to a protonated nitrogen atom that has a length of at least six carbon atoms.

25. A nanocomposite composition comprising a matrix polymer in an amount of about 40% to about 99.95% by weight, and about 0.05% to about 60% by weight of an intercalated smectite clay formed by contacting a smectite clay with intercalant multi-charged onium ions selected from the group consisting of di-ammonium, di-sulfonium, di-oxonium; ammonium/phosphonium; ammonium/sulfonium; ammonium/-oxonium; phosphonium/sulfonium; phosphonium/oxonium; sulfonium/oxonium; and mixtures thereof, to form an intercalating composition, having a molar ratio of multi-charged onium ions:smectite clay interlayer exchangeable cations of at least about 0.25:1 to achieve sorption of the multi-charged onium ions between adjacent spaced layers of the smectite clay to expand the spacing between a predominance of the adjacent smectite clay platelets at least about 3 Å, when measured after sorption of the multi-charged onium ions, and a second intercalant disposed between adjacent spaced layers of the smectite clay, said second intercalant comprising a thermosetting or thermoplastic oligomer or polymer.

26. A composition in accordance with claim 25, wherein the intercalated smectite clay is exfoliated into a predominance of individual platelets.

27. A composition in accordance with claim 25, wherein the molar ratio of intercalant onium ions:smectite clay interlayer exchangeable cations is at least 0.5:1.

28. A composition in accordance with claim 25, wherein the molar ratio of intercalant onium ions:smectite clay interlayer exchangeable cations is at least 1:1.

29. A composition in accordance with claim 25, wherein the matrix polymer is selected from the group consisting of an epoxy; a polyamide; a polyvinyl alcohol; a polycarbonate; a polyvinylimine; a polyvinylpyrrolidone; a polyethylene terephthalate; and a polybutylene terephthalate.

30. A composition in accordance with claim 25, wherein the matrix polymer is MXD6 nylon.

31. A nanocomposite concentrate composition comprising about 10% by weight to about 90% by-weight of a smectite clay intercalated with multi-charged onium ions selected from the group consisting of di-ammonium, di-sulfonium, di-oxonium; ammonium/phosphonium; ammonium/sulfonium; ammonium/oxonium; phosphonium/sulfonium;

phosphonium/oxonium; sulfonium/oxonium; and mixtures thereof, and about 10 weight percent to about 90 weight percent of a matrix oligomer or polymer, wherein the intercalated smectite clay is dispersed uniformly throughout the matrix polymer.

32. A nanocomposite composition in accordance with claim 31, wherein the matrix polymer is intercalated into the smectite clay.

33. A nanocomposite composition in accordance with claim 32, wherein the matrix polymer is intercalated into the smectite clay while dispersing the smectite clay throughout the matrix polymer.

34. A nanocomposite composition in accordance with claim 32, wherein the matrix polymer is intercalated into the smectite clay prior to dispersing the smectite clay throughout the matrix polymer.

35. A nanocomposite composition in accordance with claim 31, wherein both the matrix polymer and the polymer intercalated into the smectite clay are a polymer or oligomer of the reaction product of meta-xylylene diamine and adipic acid.

36. A nanocomposite composition in accordance with claim 31, wherein prior to intercalating the smectite clay with the polymer of meta-xylylene diamine and a dicarboxylic acid, the smectite clay is first intercalated with multi-charged onium ions that include at least one moiety covalently bonded to a positively charged nitrogen atom that has a length of at least six carbon atoms.

37. A method of manufacturing the composite material of claim 15, containing about 10% to about 99.95% by weight of a matrix polymer selected from the group consisting of a thermoplastic polymer, a thermosetting polymer, and mixtures thereof, and about 0.05% to about 60% by weight of the organoclay of claim 1, comprising intercalating a smectite clay by contact with multi-charged onium ions, mixing the intercalated smectite clay with a melt of the matrix polymer, and mixing the polymer melt and the intercalated smectite clay together to intercalate the matrix polymer between adjacent platelets of the smectite clay.

38. The method of claim 37, wherein mixing of the intercalate and the polymer melt is accomplished by extruding the intercalate/polymer melt mixture.

39. A method of manufacturing a composite material comprising 10% to 99.95% by weight of a matrix polymer and about 0.05% to about 60% by weight of an intercalate comprising intercalating a smectite clay by contacting the smectite clay with multi-charged onium ions to exchange the multi-charged onium ions for at least a portion of the interlayer exchangeable cations of the smectite clay; mixing the intercalated smectite clay with one or more monomer or oligomer reactants capable of polymerizing to form said matrix polymer, while in contact with said intercalate, and subjecting the mixture to conditions sufficient to polymerize said reactants to form said matrix polymer.

40. A method of manufacturing a composite material comprising contacting a smectite clay with multi-charged onium ions to intercalate the multi-charged onium ions between adjacent layers of said smectite clay, thereby increasing the spacing between adjacent layers of the smectite clay at least 3 Å;

simultaneously or subsequently contacting the smectite clay with a solution or dispersion of an oligomer or polymer to intercalate the oligomer or polymer between adjacent layers of the smectite clay to expand the spacing between the adjacent layers of said smectite clay at least an additional 3 Å; and mixing the smectite clay, having said multi-charged onium ions and said oligomer or polymer intercalated between adjacent layers of said smectite clay with an oligomer or polymer matrix material.

41. The method of claim 40, wherein the oligomer or polymer intercalated between adjacent layers of said smectite clay is the same oligomer or polymer matrix material mixed with said intercalate.

42. A method of manufacturing a nanocomposite comprising contacting a smectite clay with multi-charged onium ions to intercalate the multi-charged onium ions between adjacent layers of the smectite clay, thereby increasing the spacing between adjacent layers of the smectite clay at least 3 Å, and simultaneously or subsequently contacting the smectite clay with an oligomer or polymer in a form selected from the group consisting of (i) a solution of the oligomer or polymer, (ii) a dispersion of said oligomer or polymer and (iii) a melt of said oligomer or polymer, to intercalate said oligomer or polymer between adjacent layers of said smectite clay and thereby further expand the spacing between adjacent layers of said smectite clay an additional at least 3 Å.

43. A method of manufacturing a composite material containing about 10% to about 99.95% by weight of a matrix polymer and about 0.05% to about 60% by weight of an intercalated smectite clay, said intercalated smectite clay having an intercalant multi-charged onium ion spacing agent intercalated between and bonded, by ion-exchange, to an inner surface of the smectite clay platelets, comprising:

contacting the smectite clay with said intercalant multi-charged onium ion spacing agent, to achieve intercalation of said intercalant multi-charged onium ion spacing agent between said adjacent smectite clay platelets in an amount sufficient to space said adjacent smectite clay platelets a distance of at least about 3 Å; and dispersing the intercalate throughout said matrix polymer to achieve intercalation of a portion of the matrix polymer between the smectite clay platelets.

44. The method of claim 43, wherein the concentration of the multi-charged onium ion spacing agent is in a molar ratio of onium ions:smectite clay interlayer exchangeable cations of at least 0.25:1.

45. The method of claim 44, wherein said smectite clay is contacted with said intercalant multi-charged onium ion spacing agent, and a matrix oligomer or polymer intercalant, wherein the concentration of the multi-charged onium ion spacing agent is in a molar ratio of onium ions:smectite clay interlayer exchangeable cations of at least 0.5:1.

46. The method of claim 45, wherein the concentration of the onium ion spacing agent is in a molar ratio of onium ions:smectite clay interlayer exchangeable cations of at least 1:1.

47. A method of manufacturing a composite material containing about 40% to about 99.95% by weight of a matrix thermoplastic or thermosetting polymer, and about 0.05% to about 60% by weight of an intercalated smectite clay, said intercalated smectite clay having an intercalant multi-charged onium ion spacing agent intercalated between adjacent smectite clay platelets comprising:

contacting the smectite clay with an intercalating composition including an intercalant multi-charged onium ion spacing agent in a molar ratio of onium ions:smectite clay interlayer cations of at least 0.25:1, and a thermoplastic or thermosetting matrix oligomer or polymer intercalant to achieve intercalation of said intercalant multi-charged onium ion spacing agent and said matrix oligomer or polymer intercalant between said adjacent smectite clay platelets in an amount sufficient to space said adjacent smectite clay platelets at least an additional 3 Å;

combining the intercalated smectite clay with said thermoplastic or thermosetting matrix polymer, and heating the matrix polymer sufficiently to provide for flow of said matrix polymer; and dispersing said intercalated smectite clay throughout said matrix polymer.

48. A method in accordance with claim 47, wherein the amount of multi-charged onium ion spacing agent intercalated into the smectite clay is in a molar ratio of at least 0.5:1, onium ions: exchangeable cations in the interlayer spaces of the smectite clay.

49. A method in accordance with claim 48, wherein the amount of intercalant multi-charged onium ion spacing agent intercalated into the smectite clay is in a molar ratio of at least 1:1, onium ions:exchangeable cations in the interlayer spaces of the smectite clay.

50. A method in accordance with claim 49, wherein the molar ratio of intercalated multi-charged onium ion spacing/coupling agent to interlayer smectite clay cations is from about 1:1 to about 1:5.

51. A method of manufacturing a composite material containing about 40% to about 99.95% by weight of a matrix oligomer or polymer and about 0.05% to about 60% by weight of an intercalated smectite clay comprising intercalating the smectite clay with a multi-charged onium ion spacing agent by contacting the smectite clay with multi-charged onium ions in a molar ratio of onium ions:smectite clay interlayer exchangeable cations of at least 0.25:1;

forming a mixture of the intercalated smectite clay with reactants capable of reaction to form a matrix oligomer or polymer; and subjecting the mixture to conditions sufficient to react and polymerize the reactants, to polymerize the reactants while in contact with the intercalated smectite clay and to co-intercalate the resulting oligomer or polymer between adjacent platelets of the smectite clay, wherein the reactants are combined in amounts, such that the resulting composite material contains 40% to 99.95% oligomer or polymer and 0.05% to 60% intercalated smectite clay.

52. An intercalate formed by contacting a smectite clay with a multi-charged onium ion intercalant selected from the group consisting of di-ammonium, di-sulfonium, di-oxonium; ammonium/phosphonium; ammonium/sulfonium; ammonium/oxonium; phosphonium/sulfonium; phosphonium/oxonium; sulfonium/oxonium; and mixtures thereof, said intercalate having a molar ratio of intercalant multi-charged onium ions to interlayer cations of at least about 0.25:1, to achieve sorption and ion-exchange of the multi-charged onium ions with interlayer exchangeable cations of said smectite clay to expand the spacing between a predominance of the adjacent platelets of said smectite clay to at least about 3 Å, when measured after ion-exchange with the multi-charge onium ions; and an oligomer or polymer second intercalant disposed between adjacent layers of said smectite clay, to expand the spacing between a predominance of the adjacent platelets an additional at least 3 Å.

53. An intercalate in accordance with claim 52, wherein the smectite clay is contacted with said multi-charged onium ions in an intercalating composition comprising said smectite clay, said multi-charged onium ions and a carrier for said multi-charged onium ions.

* * * * *